United States Patent
Aehthesham

(10) Patent No.: US 10,289,980 B2
(45) Date of Patent: May 14, 2019

(54) IN-MEMORY INDEX FOR EVALUATING A COMPLEX EXPRESSION

(71) Applicant: Ariba, Inc., Sunnyvale, CA (US)

(72) Inventor: Mohammed K.A. Aehthesham, Bangalore (IN)

(73) Assignee: Ariba, Inc., Sunnyvale, CA (US)

( * ) Notice: Subject to any disclaimer, the term of this patent is extended or adjusted under 35 U.S.C. 154(b) by 513 days.

(21) Appl. No.: 14/950,739

(22) Filed: Nov. 24, 2015

(65) Prior Publication Data
US 2017/0147981 A1 May 25, 2017

(51) Int. Cl.
G06Q 10/10 (2012.01)
G06F 16/242 (2019.01)

(52) U.S. Cl.
CPC ....... G06Q 10/103 (2013.01); G06F 16/2423 (2019.01)

(58) Field of Classification Search
CPC ......... G06F 17/30911; G06F 17/30631; G06F 17/30392; G06F 17/30312; G06F 17/30321; G06F 17/30917; G06F 17/30386; G06F 16/2324; G06Q 10/103
USPC ........ 707/741, 802, 696, 716, 803, 999.104, 707/999.2, 999.102, E17.123
See application file for complete search history.

(56) References Cited

U.S. PATENT DOCUMENTS

| | | | | |
|---|---|---|---|---|
| 5,870,747 | A * | 2/1999 | Sundaresan | G06F 17/30324 |
| 2003/0212670 | A1* | 11/2003 | Yalamanchi | G06F 17/2241 |
| 2004/0167864 | A1* | 8/2004 | Wang | G06F 17/30867 |
| 2006/0212420 | A1* | 9/2006 | Murthy | G06F 17/30911 |
| 2008/0097954 | A1* | 4/2008 | Dutta | G06F 17/30483 |
| 2008/0147614 | A1* | 6/2008 | Tam | G06F 17/30938 |
| 2009/0307742 | A1* | 12/2009 | Forster | G06F 21/604 726/1 |
| 2011/0246498 | A1* | 10/2011 | Forster | G06F 21/10 707/769 |
| 2012/0167111 | A1* | 6/2012 | Fortune | G06F 17/30911 718/104 |

* cited by examiner

*Primary Examiner* — Robert W Beausoliel, Jr.
*Assistant Examiner* — Pedro J Santos
(74) *Attorney, Agent, or Firm* — Schwegman Lundberg & Woessner, P.A.

(57) ABSTRACT

This disclosure is directed to a procurement server for processing one or more requisition requests from various client devices. The procurement server determines whether there is an approver that can approve of the various requisition requests. The procurement server performs this determination by evaluating one or more requisition expressions, which include various expression attributes associated with corresponding condition operators. To expedite such processing, the procurement server builds an expression index corresponding to the various requisition expressions, where the expression index includes various nodes and associations between nodes. Each node represents a unique value assignable to the expression attributes of the various requisition expressions. When the nodes of the expression index are traversed, the last node in the traversal yields an approver that can approve the requisition request. The expression index requires less memory and time to evaluate than the various requisition expressions.

15 Claims, 15 Drawing Sheets

| COLUMNS TO INCLUDE IN CSV FILE (EXPORT COLUMN HEADERS TO CREATE TEMPLATE) | | | 3 COLUMNS INCLUDED |
|---|---|---|---|
| ☐ FIELD NAME — 502 | COLUMN HEADER NAME — 504 | OPERATION — 506 | MATCHING RULE — 508 |
| ☐ EXPENSE TYPE | EXPENSE TYPE | IS EQUAL TO ▶ | EXPLICIT BY USER ◆ |
| ☐ TOTAL AMOUNT | TOTAL AMOUNT | IS LESS THAN ▶ | MATCH ANY ◆ |
| ☐ LINE ITEMS AMOUNT | LI AMOUNT | IS LESS THAN ▶ | MATCH ANY ◆ |
| [REMOVE COLUMN] — 510 | [EDIT COLUMN] — 512 | [ADD COLUMN] — 514 | |

| | TotalAmount | LiAmount | ExpenseType | User |
|---|---|---|---|---|
| 712A | 1000000 | 800000 | AAA | User1 |
| 712B | 1000000 | 50000 | BBB | User2 |
| 712C | 1000000 | 800000 | AAA | User3 |
| 712D | 800000 | 800000 | AAA | User4 |
| 712E | 1000000 | 800000 | BBB | User1 |
| 712F | 800000 | 800000 | BBB | User4 |
| 712G | 1000000 | 0 | CCC | User1 |
| 712H | 1000000 | 0 | CCC | User2 |
| 712I | 1000000 | 0 | CCC | User3 |
| 712J | 800000 | 0 | CCC | User4 |
| 712K | 1000000 | 70000 | CCC | User5 |
| 712L | 1000000 | 100000 | * | User1 |
| 712M | 1000000 | 200000 | * | User2 |
| 712N | 1000000 | 100000 | * | User3 |
| 712O | 800000 | 150000 | * | User4 |
| 712P | 1000000 | 300000 | * | User5 |

*FIG. 7A*

| | Field | Operation | Matching Rule |
|---|---|---|---|
| 722A | TotalAmount | is less than | Match any |
| 722B | LiAmount | is less than | Match any |
| 722C | ExpenseType | is equal to | Explicit by user |

IN-MEMORY INDEX FOR EVALUATING A COMPLEX EXPRESSION

TECHNICAL FIELD

The subject matter disclosed herein generally relates to systems and methods for creating an in-memory index used in evaluating complex expressions, and, in particular, to creating an in-memory index from one or more database tables of values, where the in-memory index has a smaller memory footprint than the one or more database tables.

BACKGROUND

Recent efforts have been made to move requisition processing to web-based applications. These web-based applications typically rely on backend databases to evaluate requisition requests. The backend database usually includes one or more tables of expression values, which, through the evaluation of various combinations and permutations of such values, yield a requisition approver who can approve a requisition request. It is not uncommon for such database tables to include hundreds of thousands of expression values, which take time for the web-based application to evaluate. When a requisition request is communicated to the web-based application, and the request includes multiple conditions, which each require evaluation using the expression values from the one or more database tables, the evaluation of such a requisition request can take a significant amount of time and memory on behalf of the server executing the web-based application. Thus, as more and more requisition processing is moved to the online world, more and more resources, in terms of computing power, memory, and time, are required to meet the demands of this industry.

BRIEF DESCRIPTION OF THE DRAWINGS

Some embodiments are illustrated by way of example and not limitation in the figures of the accompanying drawings.

FIG. 5 illustrates a column configuration interface of the graphical user interface of FIG. 3, in accordance with an example embodiment.

FIGS. 7A-7B illustrate an expression values table and an expression attributes table, in accordance with example embodiments.

DETAILED DESCRIPTION

Figure 1:
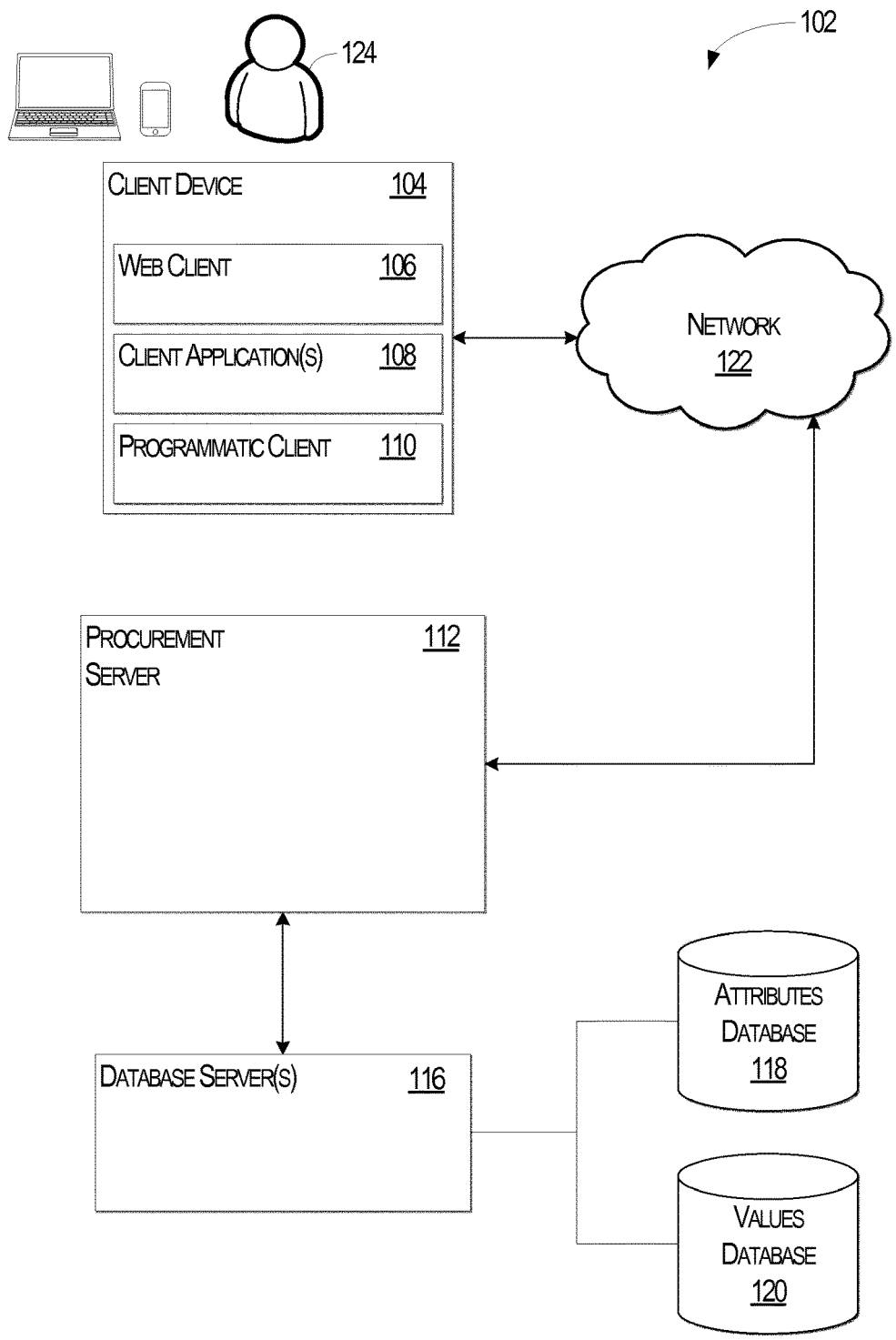
FIG. 1 is a block diagram illustrating a networked system, according to some example embodiments.

Example methods and systems are directed to a procurement client and server, where the procurement server receives one or more procurement requests from the client. The procurement server determines whether there is an individual that can approve of the one or more procurement requests by evaluating one or more previously configured requisition expressions. The procurement server creates an expression index at runtime that the procurement server evaluates in making this determination. The procurement server leverages the manner in which the one or more requisition expressions are configured to create the expression index.

As known in the art, a requisition request is an inquiry as to whether an individual (or individuals) can approve a request given certain attributes about the request. Such requests may include a request for resources such as capital equipment, vacation time, office supplies, or other such resources. Accordingly, the attributes associated with a requisition request may include, but are not limited to, the type of resource requested, the total cost of the resource, individual costs associated with the resource (e.g., one or more line item amounts), an organization that will receive the resource, and other such attributes.

Processing a requisition request may include evaluating one or more requisition expressions, which determine one or more individuals that could approve of the request. Accordingly, the procurement server includes various components that facilitate the creation of requisition expressions and evaluation of these expressions. In one embodiment, the procurement server provides a graphical user interface (GUI) displayable by the one or more client devices that a user uses to create and configure the one or more requisition expressions. In one embodiment, a requisition expression includes one or more requisition conditions which, when each (or all) are evaluated, yield an approver (such as an individual in position of authority) that could approve the requisition request. The requisition conditions are formed from an operator, such as a "less than" operator (<), a "greater than" operator (>), or an "equal" operator (=), and a corresponding value against which a user-provided value is evaluated.

In one embodiment, the procurement server facilitates the initial set up of the requisition expressions, such as by assisting an administrator (or other user) in identifying one or more expression attributes for each of the various conditions of a given requisition expression. After the expression attributes have been identified and/or defined, the administrator can then request that the procurement server export the defined attributes from the web-based application to a file readable by a database engine. Examples of such files include a Lotus® 1-2-3® file, a Microsoft® Excel® file, an OpenDocument Flat XML file, a comma-separated values (CSV) file, or any other such file readable by a database engine. Once in the exported file, the administrator (or other user) then populates the file with values to be used as operands for corresponding operators. The administrator (or other user) then uploads the populated file to the procurement server for additional processing for use in the requisition process.

After the populated file is received, the procurement server creates entries in various databases to support future requisition requests based on the populated file. In one embodiment, the procurement server creates one or more entries corresponding to the expressions previously defined by the administrator (or other user) and/or identified in the populated file. In addition, the procurement server creates one more entries corresponding to the values of the populated file. In some instances, the populated file may contain hundreds of thousands of values, for which the procurement server creates corresponding entries. In this regard, were the procurement server to evaluate a requisition request using the corresponding expressions and corresponding values, such evaluation may take upwards of several minutes to complete. However, as discussed below, this disclosure provides a mechanism that reduces such processing by several orders of magnitude.

Accordingly, when the procurement server receives a requisition request, the procurement server initially determines whether an expression index exists for the requisition expressions and expression values corresponding to the requisition request. Where the expression index does not exist, the procurement server creates it. To create the expression index, the procurement server analyzes the requisition expressions and their corresponding expression values. In one embodiment, the expression index is created as a tree structure, where nodes of the tree correspond to values previously provided in the populated file. In particular, the nodes are established such that each node represents a unique value for each defined attribute of a given requisition expression. In creating the index, the procurement server allocates memory for each unique value and establishes an association between values of one attribute and values of another attribute. Thus, an expression can be evaluated by traversing the association (e.g., the edges) between nodes. In this manner, traversing the expression index yields a reduction in the amount of time ordinarily required to evaluate a given expression. Furthermore, as the expression index has a smaller memory footprint, the expression index uses less resources than using the expression and expression values from the corresponding databases. An example of such an expression index is discussed further below with reference to FIG. 9.

In addition, the created expression index is stored as part of a Least Recently Used (LRU) data structure (e.g., an array or other similar structure) such that when the procurement server determines that the expression index has not been used for a predetermined period of time, the memory used to store the expression index can be freed and utilized for other purposes. In some instances, the LRU data structure is temporary and exists for as long as the procurement web-based application is being used, but in other instances, the LRU data structure is written to a more permanent computer-readable memory, such as a hard drive or the like, for use in future instances of the procurement web-based application.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

With reference to FIG. 1, an example embodiment of a high-level client-server-based network architecture 102 is shown. A procurement server 112 provides server-side functionality via a network 122 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on client device 104. The procurement server 112 further communicates with one or more database servers 116 that provide access to one or more databases 118, 120.

The client device 104 may comprise, but is not limited to, mobile phones, desktop computers, laptops, portable digital assistants (PDAs), smart phones, tablets, ultra books, net-books, multi-processor systems, microprocessor-based or programmable consumer electronics, or any other communication device that a user 124 may utilize to access the procurement server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, global positioning system (GPS) devices, and so forth. The client device 104 may be a device of a user 124 that is used to submit requisition requests to, and/or create requisition expressions with, the procurement server 112.

In one embodiment, the procurement server 112 is a network-based appliance that responds to initialization requests or requisition requests from the client device 104. One or more users 124 may be a person, a machine, or other means of interacting with client device 104. In embodiments, the user 124 is not part of the network architecture 102, but may interact with the network architecture 102 via client device 104 or another means. For example, one or more portions of network 122 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") that include, but are not limited to, a web browser, messaging application, electronic mail (email) application, a procurement server access client, and the like. In some embodiments, if the procurement server access client is included in the client device 104, then this application is configured to locally provide the user interface and at least some of the functionalities with the application configured to communicate with the procurement server 112, on an as needed basis, for data and/or processing capabilities not locally available (e.g., access to a database of requisition expressions, to authenticate a user 124, to create and/or build requisition expressions, etc.). Conversely if the procurement server access client is not included in the client device 104, the client device 104 may use its web browser to access the initialization and/or requisition functionalities of the procurement server 112.

One or more users 124 may be a person, a machine, or other means of interacting with the client device 104. In example embodiments, the user 124 is not part of the network architecture 102, but may interact with the network architecture 102 via the client device 104 or other means. For instance, the user 124 provides input (e.g., touch screen input or alphanumeric input) to the client device 104 and the input is communicated to the network architecture 102 via the network 122. In this instance, the procurement server 112, in response to receiving the input from the user 124, communicates information to the client device 104 via the network 122 to be presented to the user 124. In this way, the user 124 can interact with the procurement server 112 using the client device 104.

Further, while the client-server-based network architecture 102 shown in FIG. 1 employs a client-server architecture, the present subject matter is, of course, not limited to such an architecture, and could equally well find application in a distributed, or peer-to-peer, architecture system, for example.

In addition to the client device 104, the procurement server 112 communicates with other one or more database server(s) 116 and/or database(s) 118, 120. The database server(s) 116 provide access to one or more requisition expressions and/or expression values, which include requisition expressions previously defined by one or more users and expression values previously uploaded by the one or more users. The requisition expressions (e.g., the specific set of conditions that make up a requisition expression) may be stored in an expression attributes database 118. The expression values are stored in an expression values database 120, which are retrieved by the procurement server 112 and/or the database server(s) 116 in response to a requisition request. Accordingly, the database server(s) 116 may provide access to one or more of the databases 118, 120 via an Application Programming Interface (API), REST-Oriented Architecture (ROA), Service-Oriented Architecture (SOA), any other networking architecture, or combinations thereof.

While the expressions attributes database 118 and the expression values database 120 are illustrated as separate databases, one of ordinary skill in the art will appreciate that such databases may be implemented as a single database. Accordingly, references to the expressions attributes database 118 and the expression values database 120 within this disclosure should also be taken to include instances where the expression attributes database 118 and expression values database 120 are implemented as a single database. Thus, if a database table or database field are described as being inserted or created within one of the databases 118, 120, one of ordinary skill in the art will appreciate that such a database table or database field may also be created in this singular database.

In addition, one of ordinary skill in the art will recognize that the database server(s) 116 may be implemented by one or more servers or a combination of servers. For example, the database server(s) 116 may include, but are not limited to, a Microsoft® Exchange Server, a Microsoft® Sharepoint® Server, a Lightweight Directory Access Protocol (LDAP) server, or any other server configured to provide information, or combinations thereof. Accordingly, and in one embodiment, the servers that are configured to access the expression attributes database 118 and/or the expression values database 120 are further configured to communicate with the procurement server 112.

Figure 2:
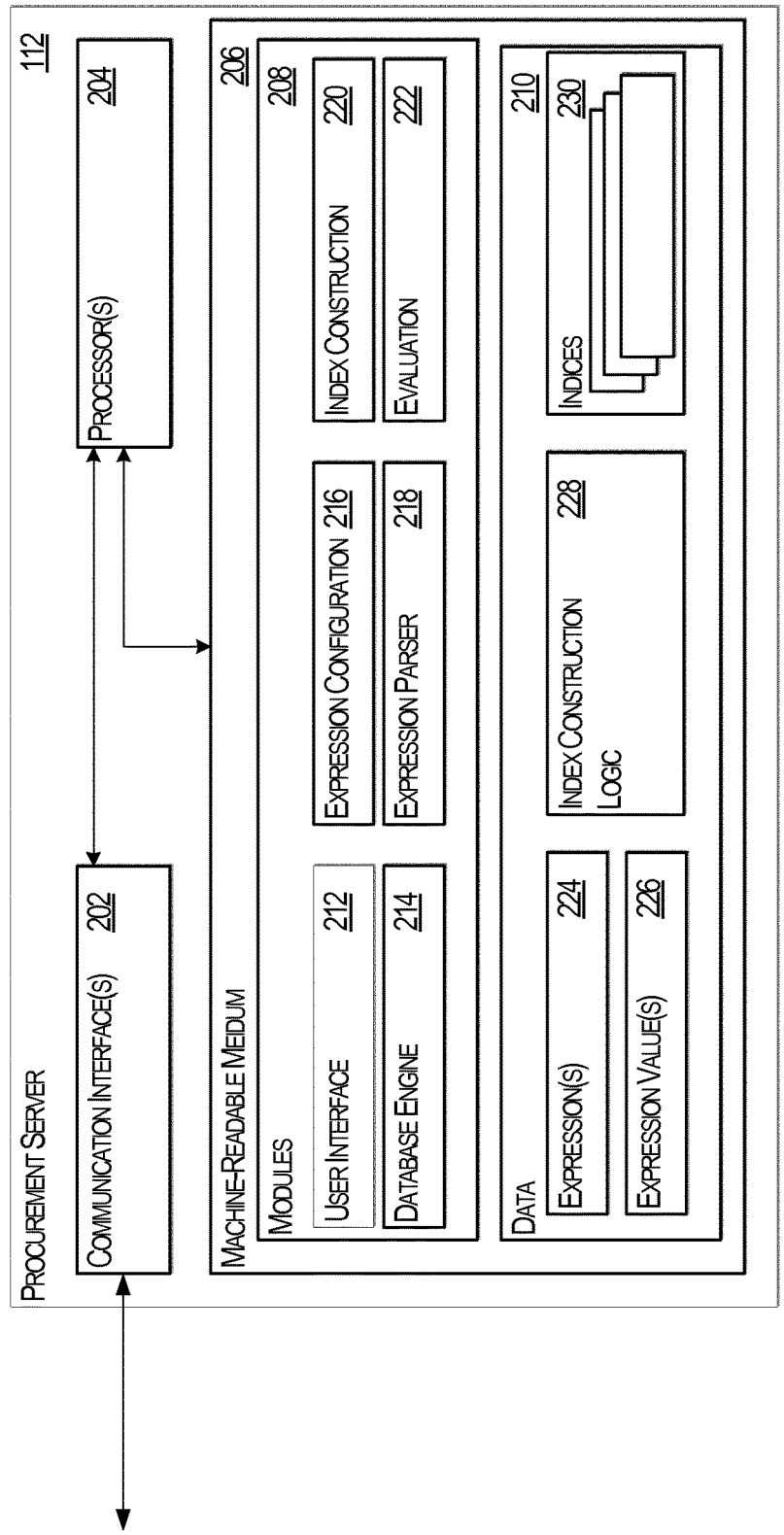
FIG. 2 illustrates the procurement server of FIG. 1, in accordance with an example embodiment.

FIG. 2 illustrates the procurement server 112 of FIG. 1, in accordance with an example embodiment. In one embodiment, the procurement server 112 includes one or more processor(s) 204, one or more communication interface(s) 202, and a machine-readable medium 206 that stores computer-executable instructions for one or more modules(s) 208 and data 210 used to support one or more functionalities of the modules 208.

The various functional components of the procurement server 112 may reside on a single device or may be distributed across several computers in various arrangements. The various components of the procurement server 112 may, furthermore, access one or more databases (e.g., databases 118, 120 or any of data 210), and each of the various components of the procurement server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the procurement server 112, the client device 104, and one or more of the database server(s) 116 and/or database(s) 118, 120. The one or more communication interfaces 202 may include one or more wired interfaces (e.g., an Ethernet interface, Universal Serial Bus (USB) interface, a Thunderbolt® interface, etc.), one or more wireless interfaces (e.g., an IEEE 802.11b/g/n interface, a Bluetooth® interface, an IEEE 802.16 interface, etc.), or a combination of such wired and wireless interfaces.

The machine-readable medium 206 includes various modules 208 and data 210 for implementing the procurement server 112. The machine-readable medium 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as a "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the procurement server 112 include, but are not limited to, a user interface module 212, a database engine module 214, an expression configuration module 216, an expression parser module 218, an index construction module 220, and an evaluation module 222. The data 210 supporting these modules 208 include, but are not limited to, expressions 224 (e.g., the conditions and/or operators that comprise a given expression), one or more expression values 226, index construction logic 228, and the constructed one or more indices 230.

The user interface module 212 is configured to provide access to, and interactions with, the procurement server 112. In one embodiment, the user interface module 212 provides one or more graphical user interfaces to the client device 104, which may be communicated and/or transmitted using Hypertext Transfer Protocol (HTTP). The graphical user interfaces are displayable by the client device 104 and accept input from the user 124 for interacting with the procurement server 112. Further still, the user interface module 212 may be configured to provide such interfaces to one or more clients displayable by the client device 104, such as the web client 106, one or more client applications 108, or the programmatic client 110. By interacting with the user interface module 212, the user 124 can instruct the procurement server 112 to generate one of the one or more expressions 224, to generate the one or more indices 230, and to evaluate various requisition requests using the constructed one or more indices 230. Further still, the user interface module 212 is configured to provide results from the evaluation module 222 which, in one embodiment, includes a listing of one or more personnel who can authorize a requisition request.

The database engine 214 is configured to perform a variety of operations relating to the management and population of the expression attributes database 118 and the expression values database 120. For example, the database engine 214 is configured to populate the expression attributes database 118 with one or more expression conditions corresponding to one or more expression attributes for one or more requisition expressions. In addition, the database engine 214 is configured to populate the expression values database 120 with one or more expression values corresponding to respective expression attributes stored in the expression attributes database 118. In one embodiment, the database engine 214 populates the expression values database 120 with expression values received from a file communicated from the client device 104 to the procurement server 112.

The database engine 214 is configured to retrieve a requisition expression from the requisition expression attributes database 118 in response to received requisition requests. Retrieved expressions and/or expressions provided by the user 124 may be stored as expressions 224. Similarly, when the requisition expression is retrieved, the database engine 214 also retrieves corresponding expression values stored in the expression values database 120. Accordingly, the retrieved expression values, or the expression values provided by the user 124, are stored as expression values 226. In one embodiment, the database engine 214 is implemented as a relational database management system, such as SQLite, MySQL, or PostgreSQL. In this embodiment, expression attributes database 118 and expression values database 120 are implemented as relational databases. Accordingly, the expression attributes and the expression conditions used to define the requisition expression may be stored within one or more fields of the expression attributes database 118. Similarly, the expression values may be stored within one or more fields of the expression values database 120. In alternative embodiments, the expression attributes database 118 and/or the expression values database 120 are implemented as a hierarchical database, an object-oriented database, a flat file database, or combinations thereof.

The expression configuration module 216 is configured to facilitate the configuration of one or more requisition expressions. As discussed above, processing a requisition request may involve evaluating multiple requisition expressions. For example, and in one embodiment, a requisition expression is assigned a requisition type such that multiple requisition expressions may be assigned the same requisition type. Additionally or alternatively, a given requisition expression may be assigned multiple requisition types.

The expression configuration module 216 helps the user define those expression conditions which are to be evaluated when a requisition request is received. Each of the requisition conditions may comprise one or more expression attributes. Examples of attributes include, but are not limited to, requisition or expense type, the organization that will receive the requested resource, the total or expected total cost of the resource, specific line items amounts to procure the resource, the operator (e.g., "less than," "greater than," etc.) used to evaluate the expression condition, and other such attributes or combinations thereof. In one embodiment, the expression configuration module 216 communicates with the user interface module 212 to present an interface to the user 124 for defining the expression conditions and/or attributes of a given requisition expression. An example of a user interface for configuring a requisition expression is illustrated in FIGS. 3-6.

In one embodiment, an expression attribute is associated with a expression condition that, when the expression condition is satisfied, yields a person or persons that can approve the requisition request. For example, a total cost attribute may be associated with one or more conditions identifying corresponding approvers (e.g., person or persons that can approve the request). As another example, a line item attribute may be associated with one or more conditions identifying corresponding approvers. Further still, conditions may be combined such that satisfying a first condition for a first attribute and satisfying a second condition for a second attribute yields a given approver. In this manner, a single requisition request may involve evaluating multiple requisition expressions where each requisition expression is comprised of multiple conditions. Thus, a nontrivial amount of time can be spent by the procurement server 112 in evaluating the requisition expressions for the single requisition request. However, as discussed below with reference to the index construction module 220, an expression index reduces this amount of evaluation time significantly.

The expression parser module 218 is configured to parse a given requisition expression and identify condition operators and expression values that comprise a given requisition expression. For example, the expression parser module 218 distinguishes between operators such as the "less than," "greater than," and "equal to" operators. Furthermore, the expression parser module 218 identifies if more than one expression condition uses the same condition operator and, if so, which expression conditions. In one embodiment, the expression parser module 218 accesses various fields of the expression attributes database 118 to identify expression conditions, expression attributes, and condition operators that comprise a given requisition expression.

As discussed below, tracking which of the expression conditions use the same condition operator is useful because the index construction module 220 may construct the corresponding expression index according to condition operator and value cardinality (e.g., the number of unique values assigned to a given requisition attribute). Thus, where more than one expression condition uses the same condition operator, the index construction module 220 may build a corresponding expression index in order of the conditions' cardinality. In one embodiment, the expression parser module 218 is invoked by the index construction module 220 in response to a determination by the index construction module 220 than an expression index does not exist for a given set of requisition expressions.

The index construction module 220 is configured to build an expression index corresponding to a given set of requisition expressions. In one embodiment, the index construction module 220 determines whether an expression index exists for a corresponding set of requisition expressions (e.g., the set of requisition expressions to be evaluated in response to a requisition request). Where the expression index does not exist, the index construction module 220 creates it. The creation of the expression index may be performed at runtime (e.g., in response to a requisition request) or at another, predetermined time (e.g., after the requisition expressions are configured and the corresponding expression values have been provided).

In one embodiment, the expression index construction module 220 leverages index construction logic 228, which provides the logic and/or rules for constructing an expression index. The index construction logic 228 may provide that an expression index is to be constructed similar to a trie (e.g., an ordered tree data structure that is used to store a dynamic set of data). In particular, the expression index (e.g., the trie) may comprise multiple levels of nodes, where an individual level represents an expression condition for a requisition expression. Furthermore, in some embodiments of the expression index, no one node may be considered the root node, but a level of the expression index may be considered a root level (e.g., a node selected from the root level is considered a starting point for traversing the expression index).

The nodes for a given level represent the unique values corresponding to an expression attribute used by the corresponding expression condition. In this manner, some levels of the expression index will have fewer nodes than other levels, whereas some levels of the expression index will have more nodes than other levels. An edge between nodes is established according to whether the value represented by a node in a first level is associated with the value represented by a node in a second level in the requisition expression. The expression index may be implemented using different types of memory constructs such as pointers, a multi-dimensional array, and other such memory constructs. An example of a constructed expression index is discussed below with reference to FIG. 9.

In addition, the index construction logic 228 provides the order in which the levels of the expression index are built and, in one embodiment, specifies that the expression index is to be built according to a condition operator. For example, the index construction logic 228 may provide that the expression index should be constructed by first allocating memory for the values associated with the results (e.g., the approvers) of a selected set of requisition expressions, followed by allocating memory for the values associated with the "less than" operator, followed by allocating memory for the values associated with the "greater than" operator, then followed by allocating memory for the values associated with the "equal to" operator. As the index construction module 220 allocates memory for a given set of values, the values are inserted as nodes into the expression index being constructed. When the node is inserted, an edge is established between the node and any parent nodes and/or any child nodes. In some instances, the index construction module 220 may create nodes for the unique values of each expression condition, but then link such nodes after all the nodes have been created. Alternatively, such nodes may be linked as each expression condition is processed.

Should a conflict exist among expression conditions (e.g., more than one expression condition has the same condition operator), the index construction logic 228 may specify that a predetermined expression attribute having the least cardinality (e.g., the least number of unique values) be processed first followed by processing expression attributes in order of increasing cardinality. Once the index construction module 220 has finished processing a set of requisition expressions, the constructed expression index is stored as part of the expression indices 230.

The expression index may be stored temporarily or semi-permanently by the procurement server 112. In one embodiment, the expression index is stored in an LRU data structure to be used while the user 124 is engaged with the procurement server 112. In this embodiment, the procurement server 112 retains the expression index until one or more conditions are reached, such as a predetermined time period having elapsed, a predetermined amount of memory having been used and additional memory being needed, a predetermined number of expression indices have been created, or other such conditions. In an alternative embodiment, the expression index is stored for later retrieval and use, such as in the expression attributes database 118 or other similar database.

The index construction module 220 further supports updates and/or modifications to the previously constructed expression index. In one embodiment, where a requisition expression is modified via the expression configuration module 216 and the user interface module 212, the index construction module 220 is instantiated to update the nodes and/or edges of the corresponding expression index. In this regard, the index construction module 220 retrieves the corresponding expression index, identifies the expression values or condition operators that have changed (e.g., by comparing the previous expression values with the changed expression values or by comparing the previous condition operators with the change condition operators), and updates the corresponding nodes of the expression index with the changed values and/or condition operators (e.g., by inserting and/or removing one or more nodes accordingly). One of ordinary skill in the art will understand that by inserting and/or removing one or more nodes, corresponding edges and associations between nodes will also be changed.

The evaluation module 222 is configured to evaluate a requisition request using a corresponding expression index 230. To evaluate a requisition request, the evaluation module 222 traverses the edges between nodes of the corresponding expression index using the values received for the requisition attributes from the received requisition request. For each level of the expression index traversed, the evaluation module 222 selects the node whose condition operator is satisfied when evaluated against the expression value assigned to the node and the value of the respective attribute of the received requisition request. When the node is selected, the evaluation module 222 then identifies the child nodes of the selected node, and performs a similar selection for the child nodes using the respective requisition attribute of the received requisition requests. An example of evaluating a requisition request using a constructed expression index is discussed with reference to FIG. 9.

By continuously traversing the expression index in this manner, the evaluation module 222 ultimately reaches a node associated with an approver that can approve the requisition request. Where none of the condition operators can be satisfied for a given level of the expression index, the evaluation module 222 may return an error or other message indicating that there are no personnel that can approve of the requisition request. In this manner, evaluation of the expression index takes significantly less time and memory than if the evaluation module 222 were to evaluate the set of the requisition expressions associated with the requisition request.

Figure 3:
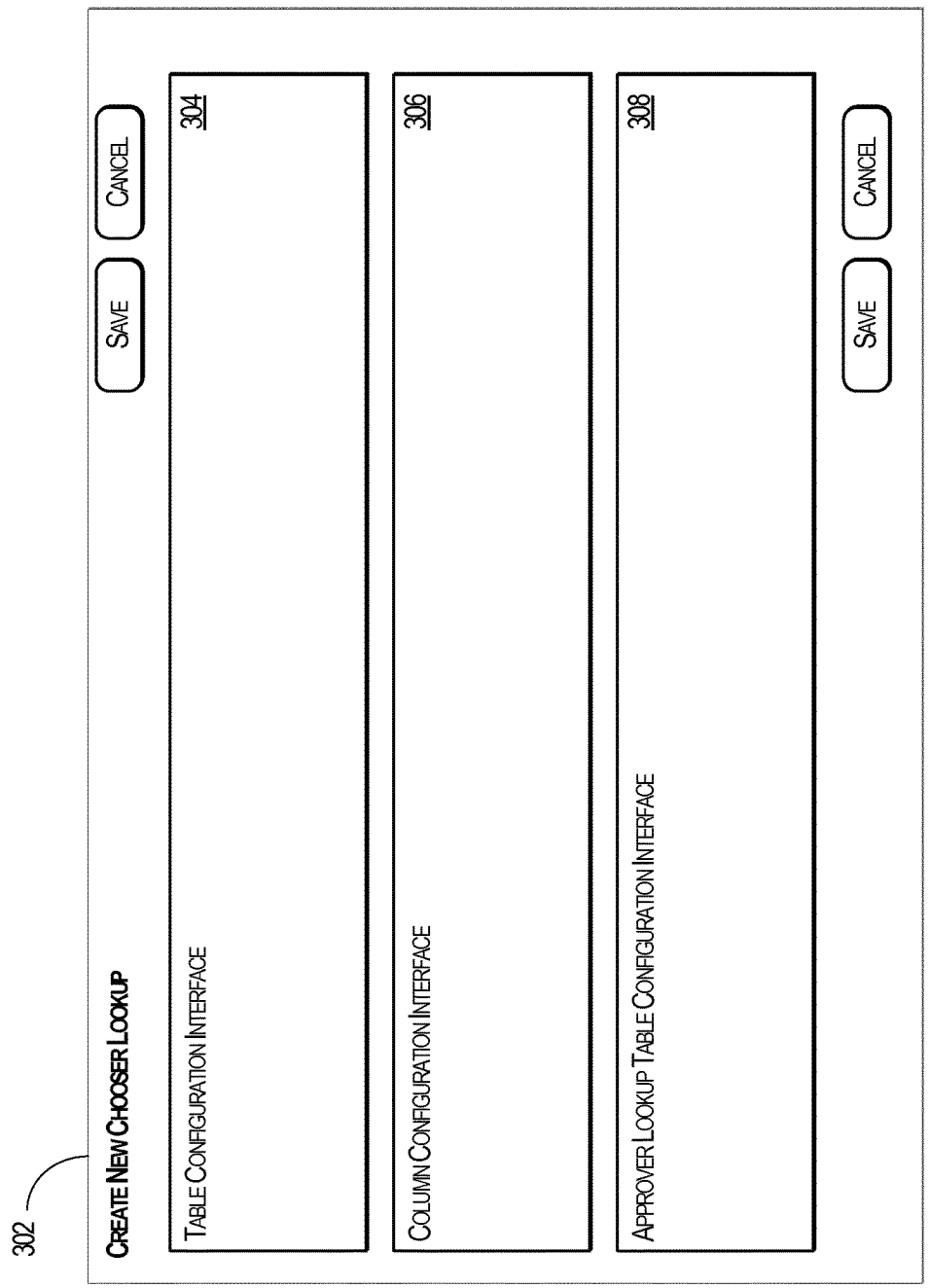
FIG. 3 illustrates a graphical user interface for configuring one or more requisition expressions, in accordance with an example embodiment.

FIG. 3 illustrates a graphical user interface 302 for configuring one or more requisition expressions, in accordance with an example embodiment. The graphical user interface 302 is provided by the user interface module 212 and displayed by the client device 104. In one embodiment, the graphical user interface 302 is provided in a computer programming and/or scripting language including, but not limited to, Hypertext Markup Language (HTML), C, C++, Java, JavaScript, PHP, any other suitable computer programming and/or scripting language, or combinations thereof. As shown in FIG. 3, the graphical user interface 302 is divided into three portions: a table configuration interface 304, a column configuration interface 306, and an approver lookup table configuration interface 308.

Figure 4:
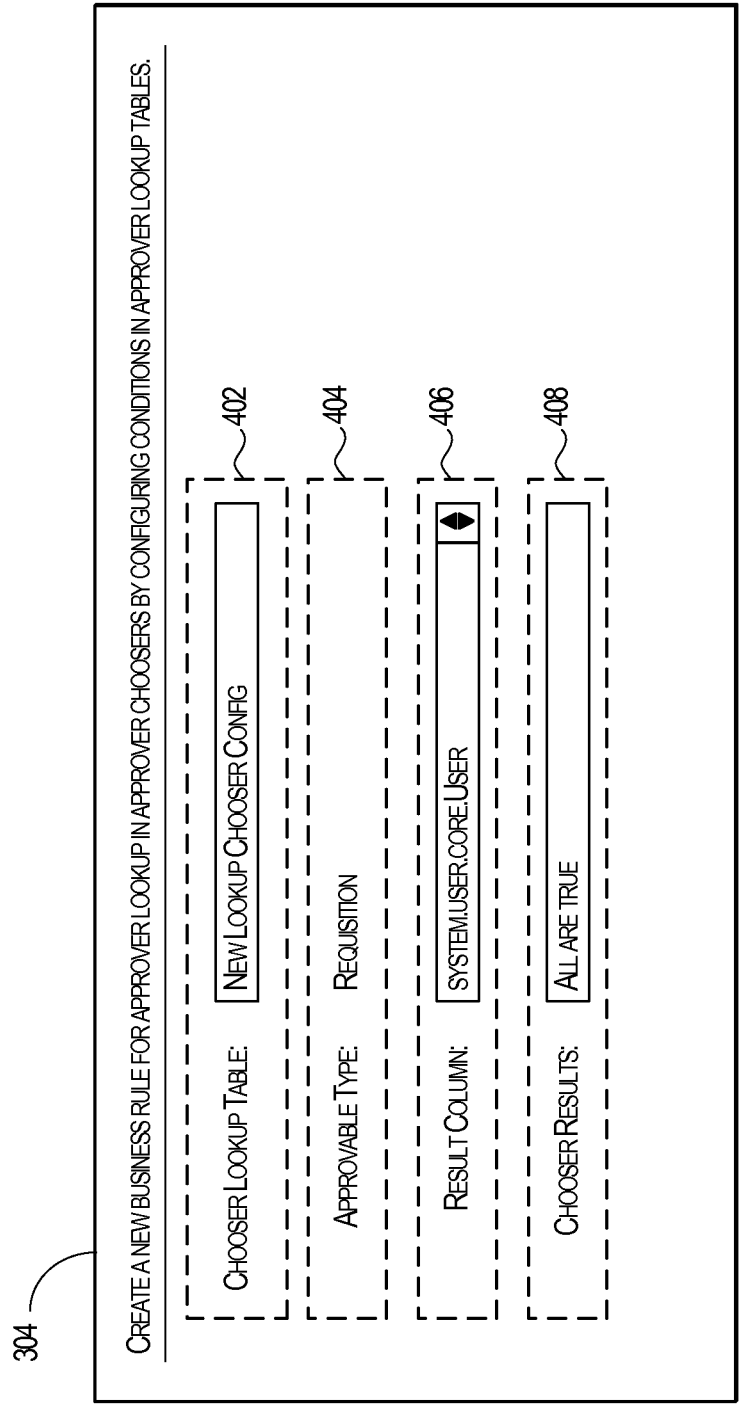
FIG. 4 illustrates a table configuration interface of the graphical user interface of FIG. 3, in accordance with an example embodiment.

FIG. 4 illustrates the table configuration interface 304 of the graphical user interface 302 of FIG. 3, in accordance with an example embodiment. As shown in FIG. 4, the table configuration interface 304 displays various attributes 402-408 that the user 124 may configure in defining a new set of requisition expressions. In particular, and with reference to FIG. 1, when a new set of requisition expressions are defined, the procurement server 112 creates a new database table within the expression attributes database 118 and/or a new database table within the expression values database 120. Accordingly, the attributes 402-408 displayed by the table configuration interface 304 are used to define the attributes of the newly created database table.

In one embodiment, the attributes 402-408 of the database table for the requisition expressions include, but are not limited to, a lookup table name attribute 402, an approvable type attribute 404, a result column attribute 406, and a chooser results attribute 408. The lookup table name attribute 402 identifies the database table name of the database table created within the expression attributes database 118 and/or the expression database 120. The lookup table name attribute 402 may include a text box or other input element that allows the user 124 to input a name for the database table to be created. The approvable type attribute 404 identifies the type of approvable for which the new database table is being created. As shown in FIG. 4, the approvable type attribute 404 has been selected as "requisition."

The result column attribute 406 displays the default result column name of approvers who satisfy one or more conditions of a requisition expression based on the chooser results attribute 408. The chooser results attribute 408 determines whether the list of chooser results (e.g., qualified approvers) is the intersection or union of the matching approvers found when the uploaded file is processed. In one embodiment, the selectable values for the chooser results attribute 408 include an "all are true" value and an "any are true" value. With the "all are true" value, evaluation module 222 will filter the list of qualified approvers to show approvers who can approve all line items. This is the intersection of the approvers across line items. With the "any are true" value, the evaluation module 222 will filter the list to show approvers who can approve any of the line items. This is the union of the approvers for all line items. Any match from the uploaded file is considered as the result.

FIG. 5 illustrates the column configuration interface 306 of the graphical user interface 302 of FIG. 3, in accordance with an example embodiment. Using the column configuration interface 306, the user 124 can configure the various columns of the database table to be created for the set of requisition expressions being defined. In one embodiment, the configurable columns include a field name attribute 502, a column header name attribute 504, an operation attribute 506, and a rule matching attribute 508. The field name attribute 502, the column header name attribute 504, the operation attribute 506, and the rule matching attribute 508 comprise the requisition attributes for a given requisition expression.

The field name attribute 502 identifies the fields to use for defining the conditions of one or more requisition expressions. This column displays the internal field names of the fields the user 124 can select. The column header name attribute 504 identifies the name of the column header for this field in the file to be populated by the user 124. The operation attribute 506 identifies the operator for evaluating a condition of the requisition expression. Using the column configuration interface 306, the user 124 may select such operators as "is equal to," "is less than," "is greater than," and other such operators for the operation attribute 506. Finally, the rule matching attribute 508 determines how wild cards are treated in the uploaded file and whether rows can override other rows in the table. The values of the rule matching attribute 508 include "match any," "explicit by value," and "explicit by user." The "match any" rule matching value matches any row in the lookup table and displays any approvers meeting the condition. It also includes a wild card search and allows overriding in the table. The "explicit by value" rule matching value includes both wild card search and explicit specification. This instructs the evaluation module 222 to evaluate each and every row in the lookup table and displays the approvers who meet one or more of the conditions. It also signifies that rows can override other rows in the table. Finally, the "explicit by user" rule matching value instructs the evaluation module 222 to ignore wild card search and looks for approvers who meet the condition explicitly. This value also allows rows to override other rows in the table.

The column configuration interface 306 also includes input elements 510-514 for adding, editing, and removing columns from the database table of the requisition expressions. In one embodiment, the input elements 510-514 include a remove column input element 510, an edit column input element 512, and an add column input element 514. Accordingly, selecting the remove column input element 510 causes the removal of a selected column, selecting the edit column input element 512 causes an edit to a selected column, and the add column input element 514 causes a new column to be added.

Figure 6:
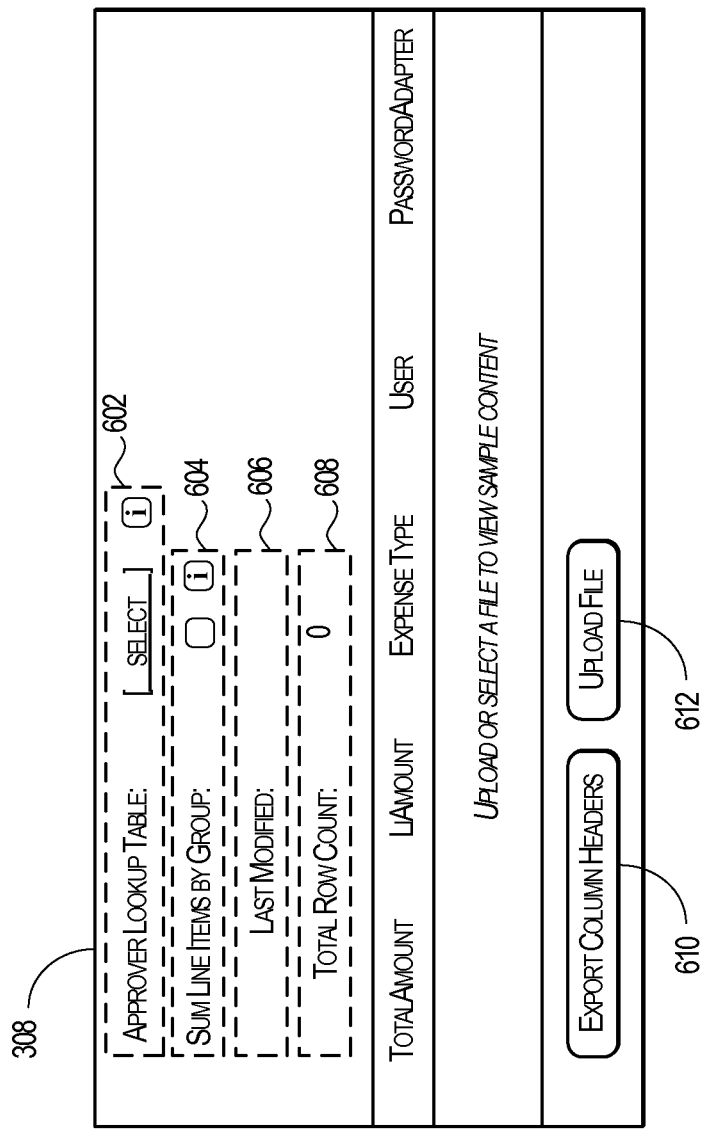
FIG. 6 illustrates an approver lookup table configuration interface of the graphical user interface of FIG. 3, in accordance with an example embodiment.

FIG. 6 illustrates the approver lookup table configuration interface 308 of the graphical user interface 302 of FIG. 3, in accordance with an example embodiment. As shown in FIG. 6, the approver lookup table configuration interface 308 includes various attributes 602-608 characterizing the database table being configured. In one embodiment, the attributes 602-608 include a target attribute 602, a summation attribute 604, a last modified date attribute 606, and a row count attribute 608. The target attribute 602 identifies the name of the file to be uploaded to the procurement server 112, the summation attribute 604 identifies whether one or more line items should be summed according to their grouping, the last modified date attribute 606 identifies the date on which the file to be uploaded was last modified, and the row count attribute 608 identifies the number of rows in the file to be uploaded.

The approver lookup table configuration interface 308 also includes input elements 610, 612. In particular, the input elements 610, 612 include an export input element 610 and an upload input element 612. Selection of the export input element 610 causes the expression configuration module 216 to export a file containing the columns designated in the column configuration interface 306. Selection of the upload input element 612 causes a file, designated by the target attribute 602, to be uploaded to the procurement server 112. As discussed above, the procurement server 112 then imports the expression values contained within the uploaded file to the expression values database 120, which is then used to evaluate one or more received requisition requests.

FIG. 7A illustrates an expression values table 702, in accordance with an example embodiment. The table 702 may be electronically represented within a file, such as a Microsoft® Excel® file, which can be uploaded to the procurement server 112 for use in evaluating one or more requisitions requests. Alternatively, the table 702 may be electronically represented within a comma-separated values file, where the position of a value designates its assigned requisition attribute (e.g., the first position in a row indicates that the value is for a "TotalAmount" requisition attribute and the second position in a row indicates that the value is for an "LiAmount" requisition attribute).

As shown in FIG. 7A, the table 702 includes four columns (e.g., four requisition attributes), namely, a total amount attribute 704, a line item amount attribute 706, an expense type attribute 708, and an approver attribute 710. Each of the attributes 704-710 are associated with various values shown in rows 712A-712P. In one embodiment, the cardinality of a given attribute 704-710 is determined by the number of unique values associated with the given attribute 704-710. Thus, the cardinality of the total amount attribute 704 is determined by the number of unique values associated with the total amount attribute 704, the cardinality of the line item amount attribute 706 is determined by the number of unique values associated with this attribute 706, and so forth.

Furthermore, in one embodiment, each row 712A-712P of the table 702 represents a requisition expression. To evaluate a given requisition expression 712A-712P, reference is made to the expression attributes tables 714 illustrated in FIG. 7B. The expression attributes table 714 includes various expression attributes 716-720 and the condition operator to apply each attribute. In one embodiment, the expression attributes 716-720 of the expression attributes tables 714 include a field attribute 716, a condition operator 718, and a rule matching attribute 720. As discussed above with reference to FIGS. 4-6, the expression attributes table 714 may be created by the expression configuration module 216 in response to the attributes defined using one or more of the interfaces 304-308.

In one embodiment, each row 722A-722C of the expression attributes table 714 corresponds to an expression condition. The field attribute 716 identifies the first operand to use in evaluating a corresponding expression condition. The condition operator 718 identifies the type of operation to apply to the value of the operand (e.g., one of the corresponding values selected from the expression values table 702) and the corresponding value extracted from the received requisition request. The rule matching attribute 720 identifies the type of rule to apply in evaluating the corresponding expression condition.

As FIG. 7B illustrates that the expression attributes table 714 includes three rows 722A-722C, each requisition expression 712A-712P of the expression values table 702 is comprised of three expression conditions. When each of the conditions 722A-722C are satisfied for a given requisition expression 712A-712P using corresponding attributes from a received requisition request, the result is an approver selected from the approver attribute 710 corresponding to the satisfied requisition expression. As one of ordinary skill in the art will appreciate, without the disclosed expression index, such evaluation would ordinarily require O(n) time, where n is the number of rows in the expression values table 702. As discussed below with reference to FIG. 9 such time can be reduced significantly with the disclosed expression index.

Figure 8:
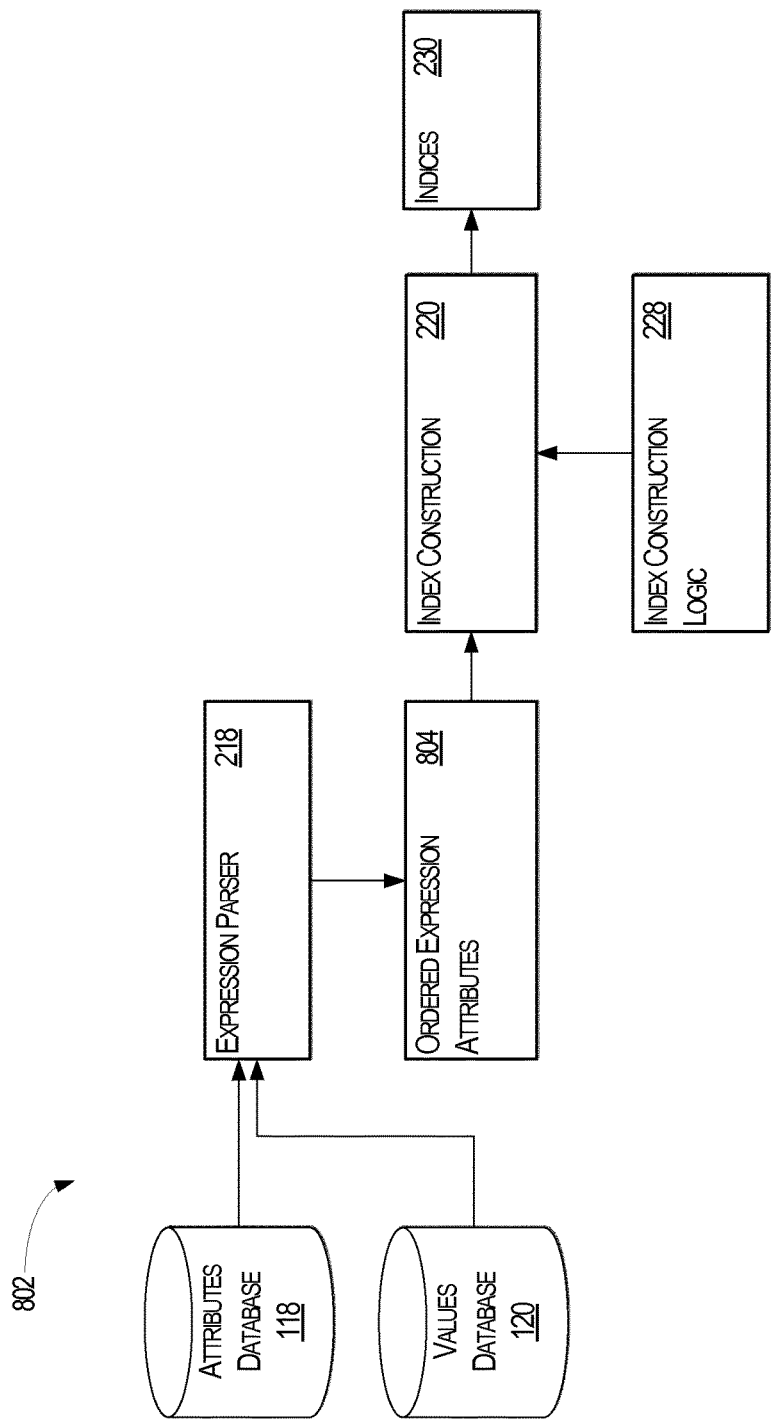
FIG. 8 illustrates a simplified workflow, in accordance with an example embodiment, for creating an expression index.

FIG. 8 illustrates a simplified workflow 802, in accordance with an example embodiment, for creating one or more expression indices 230. As discussed previously, and in further detail with reference to FIGS. 11A-11C, the disclosed expression index is created dynamically in response to a received requisition request when the procurement server 112 determines that the expression index does not exist. The expression parser module 218 then identifies the expression attributes and expression values corresponding to the received requisition request. In one embodiment, the expression attributes and the expression values are retrieved according to the type of requisition request received (e.g., the requisition request is for a capital resource or the requisition request is for a purchase less than a predetermined amount). In another embodiment, the expression attributes and the expression values are retrieved based on credentials provided by the user 124 (e.g., the user 124 is associated with a particular set of expression attributes and/or expression values). The expression parser module 218 then generates an ordered set of expression attributes 804, which indicate the order in which the index construction module 220 is to process the expression attributes being associated with one or more expression values. As discussed previously, the ordered expression attributes 804 include attributes being associated with values that are used as operands in the expression conditions identified in the expression attributes table of the attributes database 118.

The index construction module 220 then receives the ordered expression attributes along with the index construction logic 228. The index construction module 220 then generates an expression index corresponding to the set of requisition expressions defined in the retrieved expression values table from the expression values database 120. As discussed above, and in one embodiment, the requisition expressions are defined as individual rows within the expression values table (e.g., the expression values table 702 of FIG. 7A).

In constructing the expression index, the index construction module 220 refers to the condition operator identified by the expression parser module 218. In particular, the index construction module 220 processes the expression values corresponding to a given expression attribute according to the condition operator in which the expression attribute is used as an operand. Thus, the index construction logic 228 may provide instruction to the index construction module 220 to first process the expression attribute whose associated condition operator is "less than," then to process the expression attribute whose associated condition operator is "greater than," then to finally process the expression attribute whose associated condition operator is "is equal to." In alternative embodiments, the index construction logic 228 may provide that the index construction module 220 is to first allocate memory for the resultant values (e.g., the approvers indicated in the result column of the expression values table), and then process the expression attributes according to their associated condition operators. The expression index is then stored as part of the indices 230, which is discussed above, may be stored as part of a LRU data structure.

Figure 9:
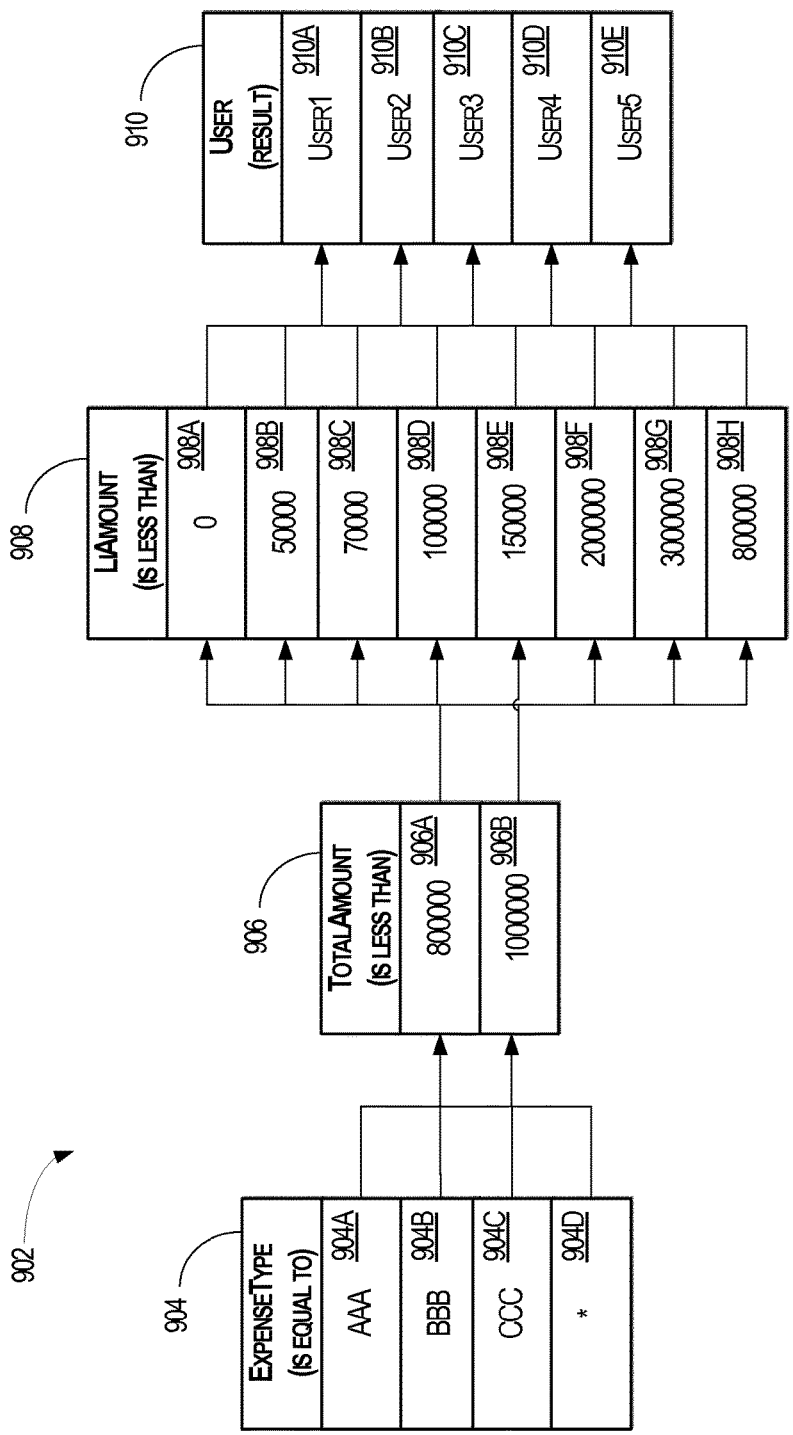
FIG. 9 illustrates a logical representation of an expression index, in accordance with an example embodiment, created from the expression values table and the expression attributes table of FIGS. 7A-7B.

FIG. 9 illustrates a logical representation of an expression index 902, in accordance with an example embodiment, created from the expression values table and the expression attributes table of FIGS. 7A-7B. As shown in FIG. 9, the expression index 902 includes four data structures 904-910. Each of the data structures 904-910 correspond to an expression attribute shown in the expression values table 702 of FIG. 7. Furthermore, each data structure 904-910 includes a plurality of nodes. For example, data structure 904 includes nodes 904A-904D, data structure 906 includes nodes 906A-906B, data structure 908 includes nodes 908A-908H, and data structure 910 includes nodes 910A-910E.

Each of the various nodes shown in FIG. 9 correspond to a unique value of their associated data structure. For example, the data structure 904 corresponds to the "expense type" expression attribute shown in the expression values table 702 of FIG. 7. In the expression values table 702, there are 15 values associated with the "expense type" expression attribute. However, of those 15 values, four of those values are unique values. Thus, the data structure 904 includes four nodes 904A-904D. As another example, the "total amount" expression attribute 704 is also associated with 15 values. However, of those 15 values, two of those values are unique values. Thus, the data structure 906 includes two nodes 906A-906B. In this manner, each of the data structures 904-910 include nodes corresponding to unique values.

Furthermore, one or more of the nodes are associated with edges that connect the one or more nodes. In one embodiment, the index construction module 220 establishes the edges between nodes by analyzing individual rows of the expression values table 702. In particular, the index construction module 220 determines those values that appear within the same row, and establishes edges between such values accordingly. In an alternative embodiment, the expression parser module 218 may provide the manner in which edges are to be established between nodes via the ordered expression attributes 804.

As one example, and with reference to FIG. 7A, the index construction module 220 identifies that the value "1,000,000" appears in the same row 712A as the values "800,000," "AAA," and "User1." Accordingly, the index construction module 220 establishes edges between the nodes corresponding to these values. Thus, there is an edge connecting node 904A and node 906B, an edge connecting node 906B and node 908H, and an edge connecting node 908H and node 910A.

As another example, and with reference to FIG. 7A, the index construction module 220 identifies that the value "1,000,000" appears in the same row 712B as the values "50,000," "BBB," and "User2." Accordingly, the index construction module 220 establishes edges between the nodes corresponding to these values. Thus, there is an edge connecting node 904B and node 906B, an edge connecting node 906B and node 908B, and an edge connecting node 908B with node 910B.

With reference to FIG. 2 and FIG. 9, the evaluation module 222 evaluates a given requisition request by traversing one or more of the edges of the expression index 902. As an example, suppose that the procurement server 112 receives a requisition request that stated an approver was needed for the requisition request shown in Table 1 below:

TABLE 1

| Expense Type | Line Amount |
|---|---|
| AAA | 100,000 |
| CCC | 60,000 |
| Total Requisition | 160,000 |

In this example, the evaluation module 222 first extracts the various requisition attributes (e.g., the expense type of attribute, the line amount attribute, and the total amount attribute) from the requisition request. The evaluation module 222 then references the expression index 902 and evaluates corresponding requisition attributes and expression values according to the condition operator for a given expression attribute. As the evaluation module 222 traverses edges between nodes, the evaluation module 222 performs an evaluation for each of the data structures 904-908, and an approver is finally obtained from traversing an edge from a node of the data structure 908 to a node of the data structure 910.

To illustrate, and starting with the expense type "AAA" of Table 1, the evaluation module 222 traverses one or more edges connecting node 904A (e.g., the node corresponding to the value of "AAA") with the nodes from data structures 906-910. As one example, the evaluation module 222 traverses the edge connecting node 904A and node 906B. The evaluation module 222 then performs the evaluation with the condition operator associated with the "total amount" expression attribute. Referencing the expression attributes table 714, the evaluation module 222 determines whether the value of "160,000" "is less than" "1,000,000." As this evaluates to true, the evaluation module 222 then proceeds to traverse one or more edges that connect node 906A with the nodes of the data structure 908. In this example, the evaluation module 222 may traverse the edge connecting node 906A with node 908H. The evaluation module 222 then performs the evaluation with the condition operator associated with the "line item amount" expression attribute. Again referencing the expression attributes table 714, the evaluation module 222 determines whether the value of "100,000" is less than "800,000." As this evaluates to true, the evaluation module 222 then proceeds to traverse the edges that connect node 908H with the nodes of the data structure 910. This final traversal yields a first set of approvers.

As other sets of approvers are obtained, the evaluation module 222 performs a union of these sets and removes any duplicate results. This unionized result set is then returned as the set of approvers that can approve the first line of the requisition request shown in Table 1 (e.g., User1, User3, User2, User4, and User5).

One of the technical advantages to the expression index 902 is that the evaluation module 222 may omit traversing one or more of the edges between nodes. One will notice that the data structures 904-910 are ordered. Thus, should one of the conditions evaluate to negative, then the evaluation module 222 is instructed to omit traversing any remaining edges. In this regard, the evaluation module 222 may select the highest value node or the lowest value node in starting its evaluation of a given data structure, depending on the condition operator (e.g., "is less than" and "is greater than,"

respectively) associated with the expression attribute corresponding to the data structure.

By traversing one or more of the edges for the nodes of the data structure 904 (e.g., node 904A and node 904C), the evaluation module 222 obtains a list of users that can approve each expense type. The list of such users are shown in Table 2 below:

TABLE 2

| Amount | Approvers |
|---|---|
| Requisition Total | User1, User2, User3, User4, User5 |
| AAA | User1, User3, User2, User4, User5 |
| CCC | User5 |
| Common across all expense types | User5 |

The evaluation module 222 then performs an intersection of the list of users across expense types (e.g., an intersection of the users of the "AAA" expense type with the users of the "CCC" expense type) to obtain a list of users that can approve of the requisition request. In the example shown above in Table 2, the user that can approve of this requisition request is "User5." This result is then communicated to the client device 104 for display to the user 124.

In some instances, the user 124 may change or modify one or more of the expression attributes of the expression attributes table and/or expression values of the expression values table. Modifications may include, but are not limited to, adding one or more rows of values to the expression values table, removing one or more rows of values from the expression values table, adding or removing expression attributes in the expression attributes table, changing condition operators within the expression attributes table, and other such modifications, or combinations thereof. In this regard, when the user 124 modifies one or more these tables via the expression configuration module 216, the expression configuration module 216 communicates an instruction to the index construction module 220 to rebuild the corresponding expression index. In one embodiment, rebuilding the corresponding expression index includes re-performing the building of the expression index (e.g., as if an expression index has not been previously created). In alternative embodiments, rebuilding the corresponding expression index includes inserting and/or removing nodes and/or data structures from the expression index according to the changes in the expression values table and/or the expression attributes table.

Figure 10A:
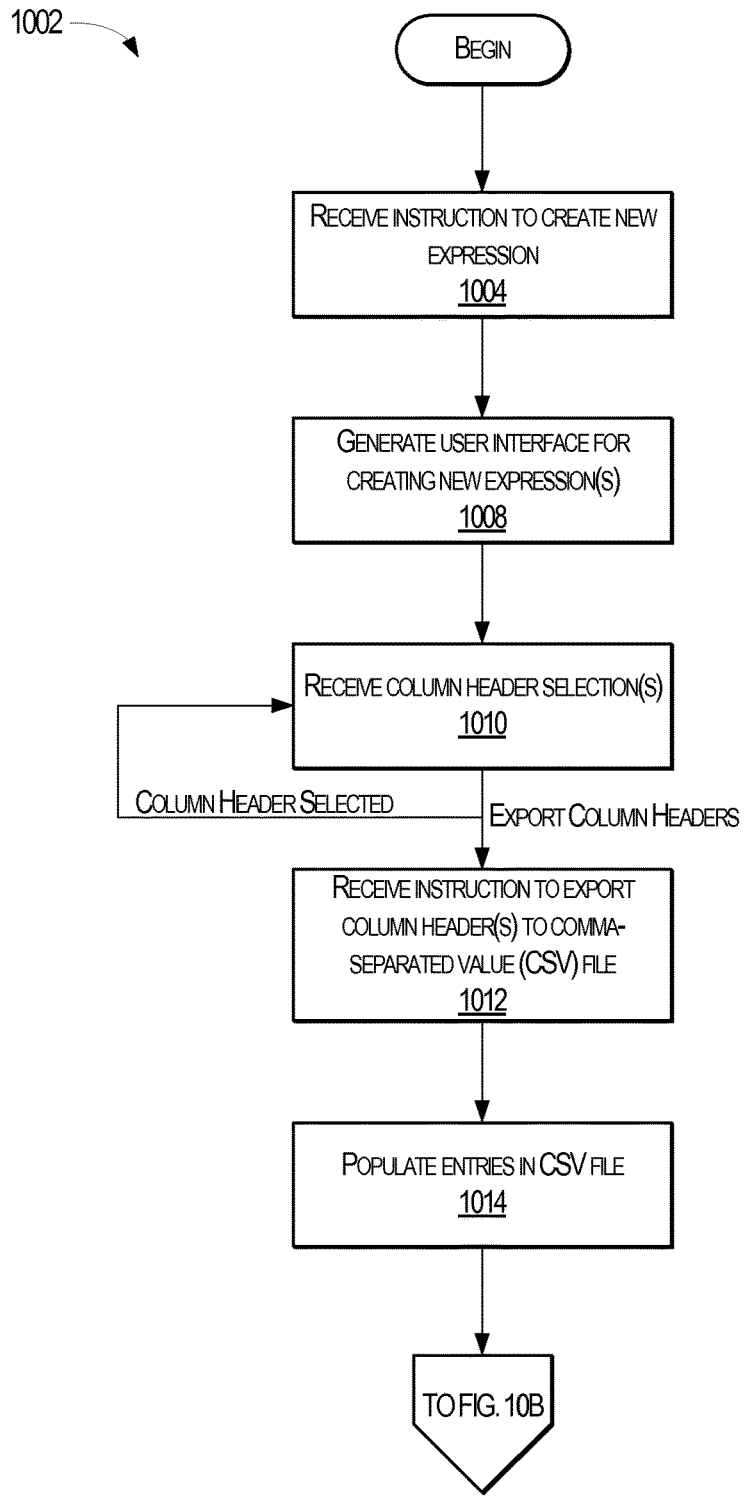
FIGS. 10A-10B illustrate a method, according to an example embodiment, for defining new expressions used to evaluate one or more requisition requests.
Figure 10B:
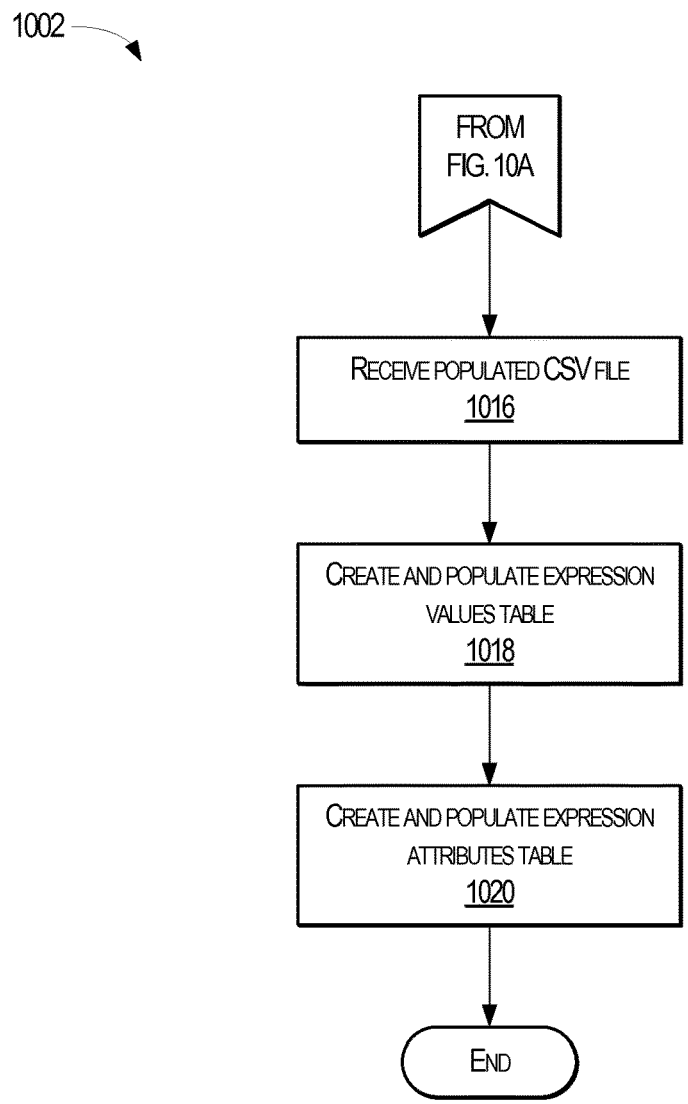

FIGS. 10A-10B illustrate a method 1002, according to an example embodiment, for defining new expressions used to evaluate one or more requisition requests. The method 1002 may be implemented by one or more modules 208 of the procurement server 112 and is described by way of reference thereto. Referring first to FIG. 10A, the procurement server 112, via the user interface module 212, initially receives an instruction to create a new requisition expression (Operation 1004). The user interface module 212 then generates the corresponding user interfaces for creating the one or more new requisition expressions (Operation 1008). As discussed above with reference to FIG. 3, the user interfaces include, in one embodiment, a table configuration interface 304, a column configuration interface 306, and an approver lookup table configuration interface 308.

The expression configuration module 216 then receives selections regarding the new expressions to be created via the user interface module 212. As discussed with reference to FIG. 5, such selections include the defining of one or more columns for a new expression values table and/or a new expressions attribute table (Operation 1010). The expression configuration module 216 continues receiving these selections, such as column header names, condition operators, matching role attributes, and other such selections, until the user 124 indicates that he or she is finished configuring the new expressions. In one embodiment, the user 124 indicates her he or she is finished configuring the new expressions by selecting an input element on the approver lookup table configuration interface 308 (Operation 1012). As discussed above with reference to FIG. 6, such an input element may include an "export column headers" input element 610.

Selecting the input element 610 causes the expression configuration module 216 to export the defined expressions to a file readable by a database engine, such as a CSV file. In one embodiment, the user 124 then populates the CSV file with expression values, where individual rows of the CSV file indicate corresponding expressions, and individual columns of the CSV file indicate corresponding expression attributes (Operation 1014).

Referring to FIG. 10B, the procurement server 112 then receives the populated CSV file from the user 124 via the client device 104 (Operation 1016). Using the populated CSV file, and via the database engine module 214, the procurement server 112 then populates a corresponding expression values table in the expression values database 120 (Operation 1018) and populates a corresponding expression attributes table in the expression attributes database 118 (Operation 1020). As discussed above, the procurement server 112 may create these new tables in their corresponding databases.

Figure 11A:
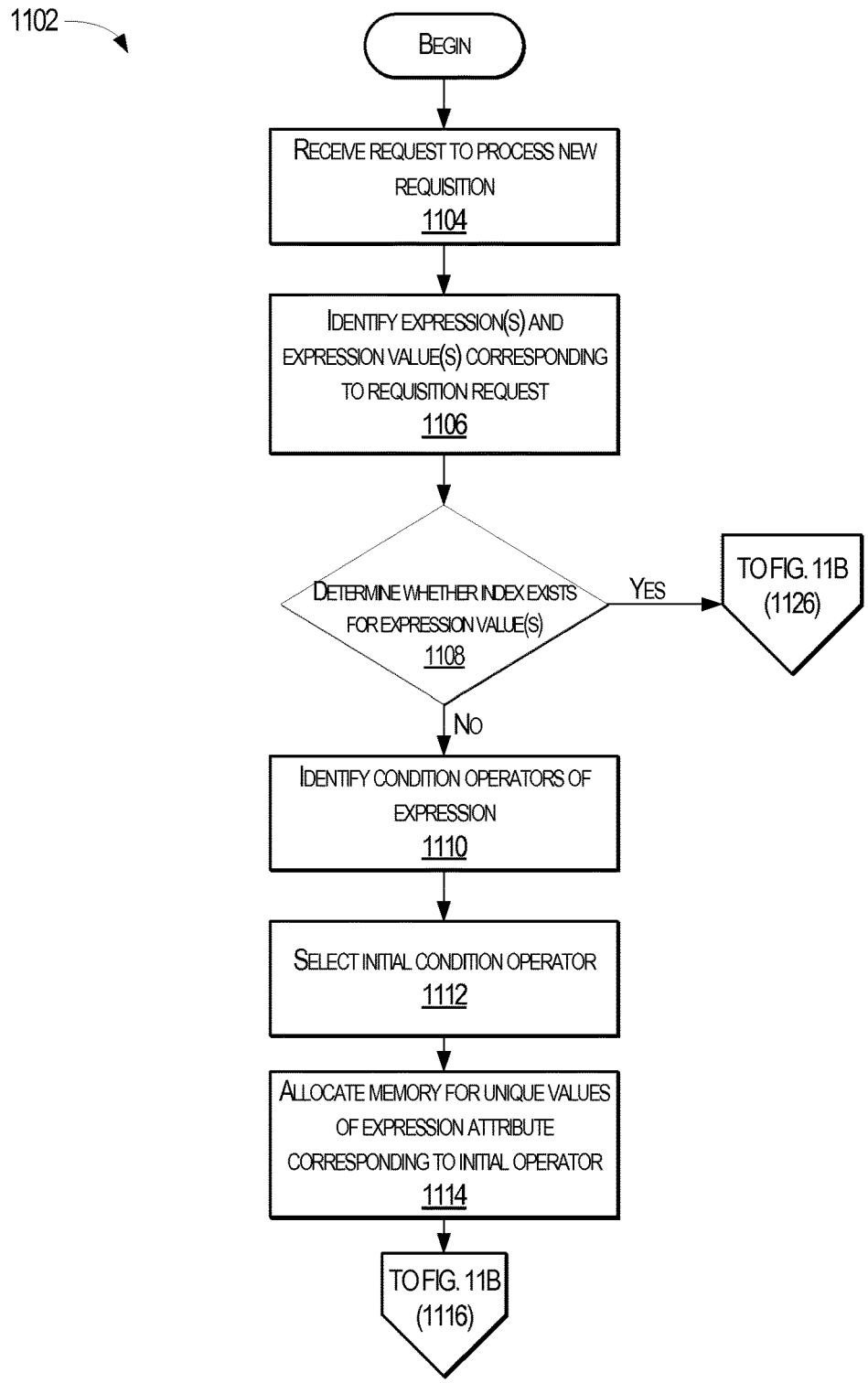
FIGS. 11A-11C illustrate a method, according to an example embodiment, for creating an expression index used in evaluating one or more requisition requests.
Figure 11B:
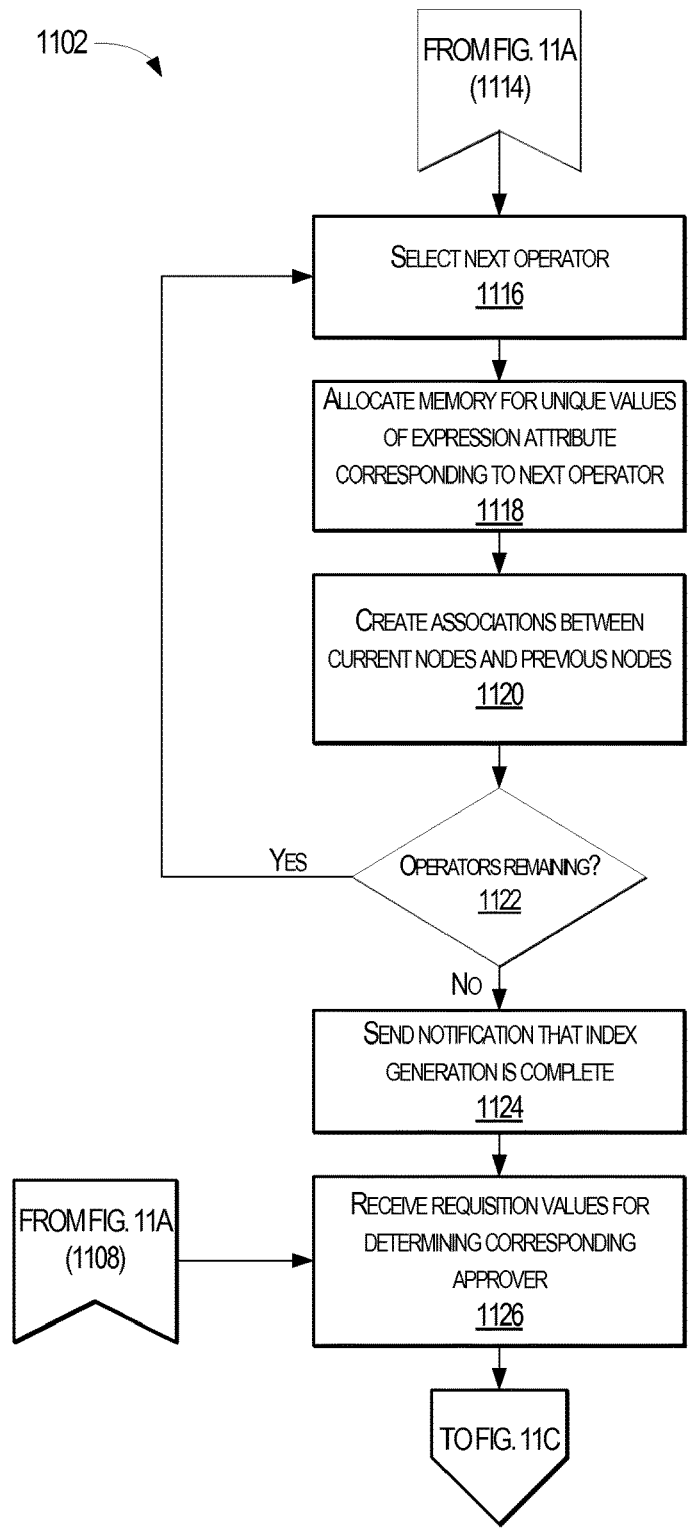
Figure 11C:
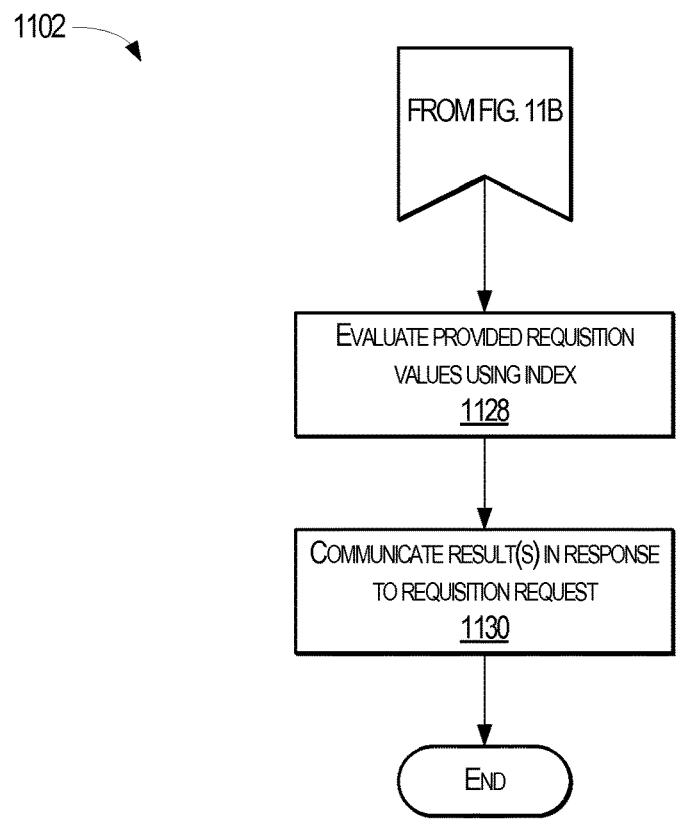

FIGS. 11A-11C illustrate a method 1102, according to an example embodiment, for creating an expression index used in evaluating one or more requisition requests. The method may be implemented by the one or more modules 208 of the procurement server 112 and is described by way of reference thereto.

With reference to FIG. 11A, the procurement server 112 initially receives a request to process a new requisition (Operation 1104). As discussed above with regard to Table 1, a new requisition request may include such requisition attributes as an "expense type" attribute, a "line item amount" attribute, a "total amount" attribute, and other such attributes or combinations thereof.

Upon receipt of the new requisition request, the expression parser module 218 identifies the corresponding expression values table and expression attributes table from the databases 118, 120 (Operation 1106). In one embodiment, the expression parser module 218 identifies the corresponding tables by referencing one or more of the requisition attributes and/or user credentials. The index construction module 220 then determines whether a corresponding expression index exists for the identified expression values table and the identified expression attributes table (Operation 1108). If this determination is made in the affirmative (e.g., "Yes" branch of Operation 1108), the method 1102 then proceeds to Operation 1126, discussed below with reference to FIG. 11B. If this determination is made in the negative (e.g., "No" branch of Operation 1108), the method 1102 then proceeds to Operation 1110.

At Operation 1110, the procurement server 112, via the expression parser module 218 and/or the index construction module 220, identifies the various condition operators of the expressions to be evaluated against the received requisition request. As discussed above, and in one embodiment, the condition operators can be returned by referencing the expression attributes table. The index construction module 220 selects an initial, or beginning, condition operator (Operation 1112). As explained previously, the initial condition operator may be the "is equal to" condition operator and/or the condition operator associated with the resultant values (e.g., the determined approvers for the requisition request). The index construction module 220 then allocates memory for the unique values of the expression attribute corresponding to this initial condition operator. As discussed above with regard to FIG. 9, the unique values may be arranged in an ordered data structure as nodes where each node is to be linked with a child node from another ordered data structure (Operation 1114).

Referring to FIG. 11B, the index construction module 220 then selects the next condition operator to process (Operation 1116). As discussed previously, the selection of the next condition operator may be according to the cardinality of the various expression attributes. Alternatively, the selection of the next condition operator may be preset in that condition operators are selected in a specific order. Accordingly, and in this implementation, where there is a conflict among the condition operators (e.g., two expression attributes are associated with the same condition operator), the index construction module 220 selects the expression attribute having the lowest cardinality (e.g., the fewest number of unique values).

The index construction module 220 then allocates memory for the unique values associated with the expression attribute of the selected condition operator (Operation 1118). In one embodiment, the index construction module 220 then establishes associations between the nodes of the current expression attribute and the nodes of the previously processed expression attribute (Operation 1120). Additionally, or alternatively, the index construction module 220 establishes the associations between nodes of the various data structures after memory has been allocated for the various data structures. At Operation 1122, the index construction module 220 then determines whether there are any condition operators remaining. Where this determination is made in the affirmative (e.g., "Yes" branch of Operation 1122), the index construction module 220 returns to Operation 1116 and selects the next condition operator to process. Where this determination is made in the negative (e.g., "No" branch of Operation 1122), the index construction module 220 continues to Operational 1124.

The index construction module 220 then communicates an instruction that it is finished processing the expression attributes table and/or expression values table associated with the received requisition request (Operation 1124). The evaluation module 222 then extracts the various requisition attribute values and requisition attributes from the received requisition request (Operation 1126). Referring to FIG. 11C, the evaluation module 222 then evaluates the received requisition request using the extracted requisition attribute values and the corresponding expression index (Operation 1128). As discussed above with regard to FIG. 9, such evaluation may include traversing one or more nodes and/or data structures of the corresponding expression index. This evaluation may also include performing a union and/or intersection of resultant values for various expression attributes of the received requisition request. Where at least one approver is obtained from this evaluation, the evaluation module 222 communicates the results to the client device 104 and/or user 124 (Operation 1130). Alternatively, where no approver is obtained, the evaluation module 222 also communicates that no approver could be found for the received requisition request.

In this manner, the disclosed procurement server 112 provides a streamlined mechanism for evaluating requisition requests where such evaluation involves several hundred or several thousand requisition expressions. This is particularly beneficial as evaluating individual expressions would ordinarily take one to two seconds; thus, evaluating thousands of such expressions would take several minutes. In this day and age, where the immediacy of server processing is expected, such evaluations are difficult to justify. However, the creation of the disclosed expression index provides a mechanism that can be evaluated quickly (e.g., in milliseconds). Furthermore, the disclosed expression index requires less memory to evaluate than the expression attributes table and/or expression values table, which can be a valuable commodity when dozens or multiple dozens of users are all requesting evaluation of multiple requisition requests. Therefore, the technical benefits of the disclosed expression index are valuable to both server operators and end-users.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-11C are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 12:
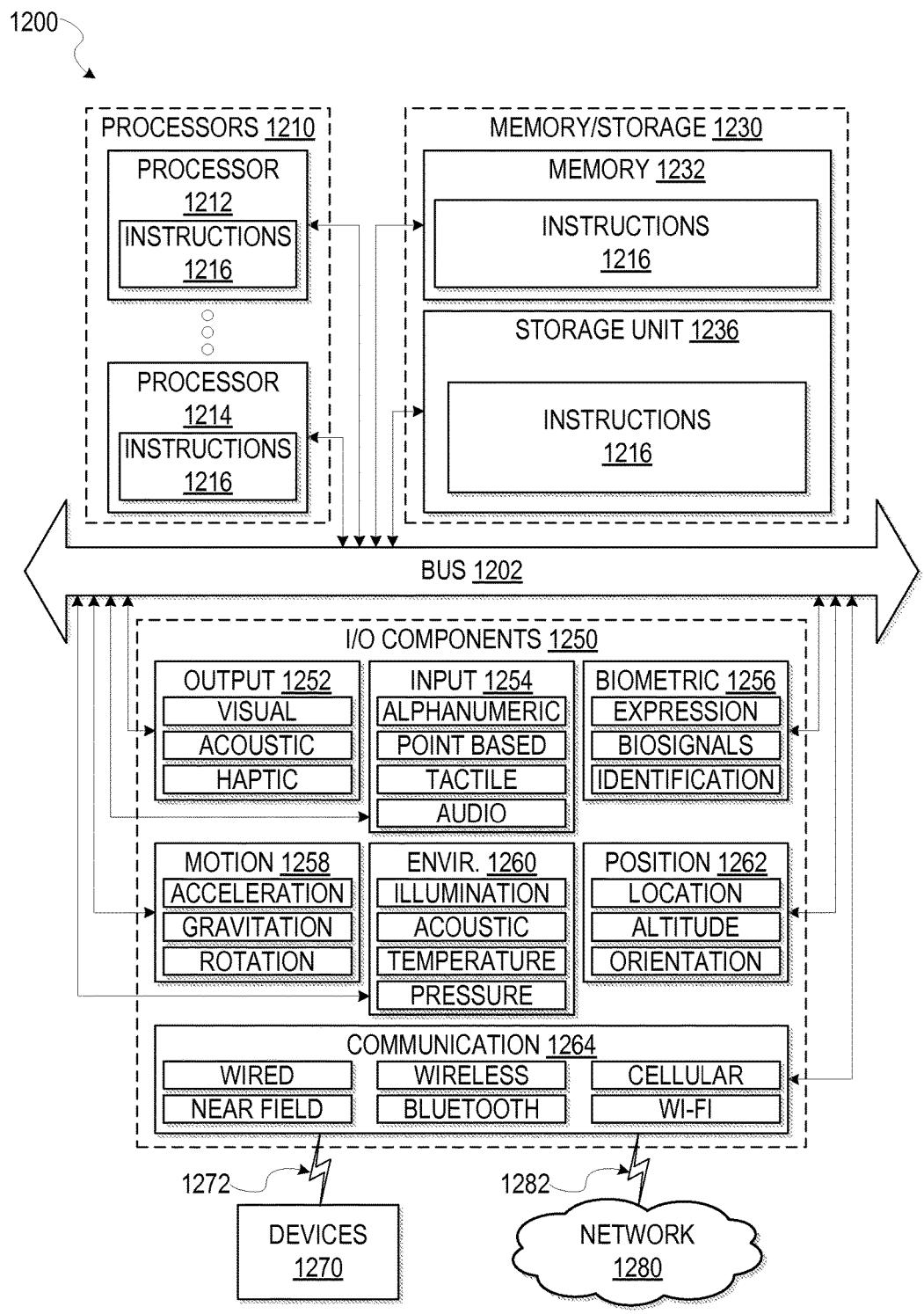
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example the instructions may cause the machine to execute the flow diagrams of FIGS. 10A-11C. Additionally, or alternatively, the instructions may implement one or more of the components of FIG. 2. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a PDA, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF412, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a non-transitory machine-readable medium storing computer-executable instructions; and
at least one hardware processor communicatively coupled to the machine-readable medium such that, when the computer-executable instructions are executed, the at least one hardware processor is configured to perform operations comprising:
receiving a requisition request to identify an approver that can approve the requisition request, the requisition request including a plurality of requisition values corresponding to a plurality of requisition attributes;
identifying an expression attributes table and an expression values table corresponding to the received requisition request;
determining whether an expression index exists corresponding to the identified expression values table;
in response to a determination that the expression index does not exist, creating the expression index, the creating of the expression index including creating a plurality of data structures corresponding to a plurality of expression attributes, a first data structure of the plurality of data structures including a first plurality of nodes, the first plurality of nodes representing a first plurality of expression values from the expression values table, the first plurality of expression values corresponding to a plurality of unique values assignable to a first expression attribute of the plurality of expression attributes, a second data structure of the plurality of data structures including a second plurality of nodes, the second plurality of nodes representing a second plurality of expression values from the expression values table, the second plurality of expression values corresponding to a plurality of unique values assignable to a second expression attribute of the plurality of expression attributes, and establishing a plurality of associations between the first plurality of nodes and the second plurality of nodes based on a plurality of connections between the first plurality of expression values and the second plurality of expression values;

evaluating the received requisition request by traversing one or more of the plurality of nodes, the traversing including using a first expression condition included in the expression attributes table that corresponds to a first requisition value of the plurality of requisition values and a second condition expression included in the expression attributes table that corresponds to a second requisition value of the plurality of requisition values; and communicating the approver in response to the received requisition request, wherein the approver corresponds to a node selected from the plurality of nodes based on the evaluating of the received requisition request.

2. The system of claim 1, where the condition operator indicates a type of comparison to perform with the at least first attribute and the requisition value.

3. The system of claim 1, where the first expression attribute is selected according to a number of the first plurality of unique values assignable to the first expression attribute.

4. The system of claim 1, where the expression values table comprises a plurality of rows and a plurality of columns, each row corresponding to a requisition expression and each column corresponding to an expression attribute.

5. The system of claim 1, where the expression attributes table comprises a plurality of rows and a plurality of columns, the rows representing a plurality of expression conditions, including the first expression condition and the second expression condition, and the columns representing a field attribute, a condition operation, and a rule matching attribute associated with each of the expression conditions.

6. A method comprising:
receiving, by at least one hardware processor, a requisition request to identify an approver that can approve the requisition request, the requisition request including a plurality of requisition values corresponding to a plurality of requisition attributes;
identifying, by the at least one hardware processor, an expression attributes table and an expression values table corresponding to the received requisition request;
determining, by the at least one hardware processor, whether an expression index exists corresponding to the identified expression values table;
in response to a determination that the expression index does not exist, creating the expression index, the creating of the expression index including creating, by the at least one hardware processor, a plurality of data structures corresponding to a plurality of expression attributes, a first data structure of the plurality of data structures including a first plurality of nodes, the first plurality of nodes representing a first plurality of expression values from the expression values table, the first plurality of expression values corresponding to a plurality of unique values assignable to a first expression attribute of the plurality of expression attributes, a second data structure of the plurality of data structures including a second plurality of nodes, the second plurality of nodes representing a second plurality of expression values from the expression values table, the second plurality of expression values corresponding to a plurality of unique values assignable to a second expression attribute of the plurality of expression attributes, and establishing a plurality of associations between the first plurality of nodes and the second plurality of nodes based on a plurality of connections between the first plurality of expression values and the second plurality of expression value;

evaluating, by the at least one hardware processor, the received requisition request by traversing one or more of the plurality of nodes, the traversing including using a first expression condition included in the expression attributes table that corresponds to a first requisition value of the plurality of requisition values and a second condition expression included in the expression attributes table that corresponds to a second requisition value of the plurality of requisition values; and communicating the approver in response to the received requisition request, wherein the approver corresponds to a node selected from the plurality of nodes based on the evaluating of the received requisition request.

7. The method of claim 6, where the condition operator indicates a type of comparison to perform with the at least first attribute and the requisition value.

8. The method of claim 6, where the first expression attribute is selected according to a number of the first plurality of unique values assignable to the first expression attribute.

9. The method of claim 6, where the expression values table comprises a plurality of rows and a plurality of columns, each row corresponding to a requisition expression and each column corresponding to an expression attribute.

10. The method of claim 9, where the expression attributes table comprises a plurality of rows and a plurality of columns, the rows representing a plurality of expression conditions, including the first expression condition and the second expression condition, and the columns representing a field attribute, a condition operation, and a rule matching attribute associated with each of the expression conditions.

11. A non-transitory machine-readable medium storing computer-executable instructions that, when executed by at least one hardware processor, cause the at least one hardware processor to perform a plurality of operations, the operations comprising:
receiving a requisition request to identify an approver that can approve the requisition request, the requisition request including a plurality of requisition values corresponding to a plurality of requisition attributes;
identifying an expression attributes table and an expression values table corresponding to the received requisition request;
determining whether an expression index exists corresponding to the identified expression values table;
in response to a determination that the expression index does not exist, creating the expression index, the creating of the expression index including creating a plurality of data structures corresponding to a plurality of expression attributes, a first data structure of the plurality of data structures including a first plurality of nodes, the first plurality of nodes representing a first plurality of expression values from the expression values table, the first plurality of expression values corresponding to a plurality of unique values assignable to a first expression attribute of the plurality of expression attributes, a second data structure of the plurality of data structures including a second plurality of nodes, the second plurality of nodes representing a second plurality of expression values from the expression values table, the second plurality of expression values corresponding to a plurality of unique values assignable to a second expression attribute of the plurality of expression attributes, and establishing a plurality of associations between the first plurality of nodes and the second plurality of nodes based on a plurality of connections between the first plurality of expression values and the second plurality of expression values;

evaluating the received requisition request by traversing one or more of the plurality of nodes, the traversing including using a first expression condition included in the expression attributes table that corresponds to a first requisition value of the plurality of requisition values and a second condition expression included in the expression attributes table that corresponds to a second requisition value of the plurality of requisition values; and communicating the approver in response to the received requisition request, wherein the approver corresponds to a node selected from the plurality of nodes based on the evaluating of the received requisition request.

12. The machine-readable medium of claim 11, where the condition operator indicates a type of comparison to perform with the at least first attribute and the requisition value.

13. The machine-readable medium of claim 11, where the first expression attribute is selected according to a number of the first plurality of unique values assignable to the first expression attribute.

14. The machine-readable medium of claim 11, where the expression values table comprises a plurality of rows and a plurality of columns, each row corresponding to a requisition expression and each column corresponding to an expression attribute.

15. The machine-readable medium of claim 14, where the expression attributes table comprises a plurality of rows and a plurality of columns, the rows representing a plurality of expression conditions, including the first expression condition and the second expression condition, and the columns representing a field attribute, a condition operation, and a rule matching attribute associated with each of the expression conditions.

* * * * *